United States Patent [19]

Brigante

[11] 4,347,133
[45] Aug. 31, 1982

[54] ELECTROMAGNETIC GROUND WATER CONDITIONING SYSTEM AND SAMPLING DEVICE FOR WASTE WATER AND FERMENTATION MAKEUP WATER

[76] Inventor: Miguel F. Brigante, 16550 NW. 10th Ave., Miami, Fla. 33169

[21] Appl. No.: 270,741

[22] Filed: Jun. 5, 1981

Related U.S. Application Data

[63] Continuation-in-part of Ser. No. 153,219, May 27, 1980, Pat. No. 4,288,323.

[51] Int. Cl.$^3$ ............................................. C02F 1/48
[52] U.S. Cl. .................................... 210/138; 210/143; 210/192; 210/195.1; 210/202; 210/223; 210/250; 210/257.1; 210/258
[58] Field of Search ............ 210/748, 752, 754, 76 A, 210/94, 138, 143, 167, 192, 195.1, 195.3, 199, 201–203, 222, 223, 250, 257.1, 258

[56] References Cited

U.S. PATENT DOCUMENTS

| | | | |
|---|---|---|---|
| 1,587,782 | 6/1926 | McNeil | 210/94 X |
| 2,046,770 | 7/1936 | Coberly et al. | 210/138 X |
| 2,834,359 | 5/1958 | Kearney | 210/222 X |
| 2,938,630 | 5/1960 | Novak | 210/764 X |
| 3,907,673 | 9/1975 | Belk et al. | 210/195.3 X |
| 4,148,731 | 4/1979 | Brigante | 210/223 |
| 4,201,140 | 5/1980 | Robinson | 210/222 X |
| 4,202,768 | 5/1980 | DeLonge et al. | 210/754 |

*Primary Examiner*—Robert H. Spitzer
*Attorney, Agent, or Firm*—Abraham A. Saffitz

[57] ABSTRACT

An electromagnetic ground water conditioning system and sampling device comprising a holding tank, a pump, filters and timers to regulate the time and duration of blowout of settled solids at the bottom of the tank. The electromagnetic water conditioning unit is that disclosed and claimed in my allowed patent application Ser. No. 153,219 filed May 27, 1980, entitled Free Flow Non-Corrosive Water Treatment Device, now U.S. Pat. No. 4,288,323. A blowout valve at the bottom of the tank is solenoid operated and regulated to discharge a small liquid volume of settled solids. One timer is a 24-hour timer to set the blowdown start, the other is a 30-minute timer which sets the duration of the blowdown. For ground water or sewage water or industrial waste water a 2-hour setting on the 24-hour timer and a 10-second setting on the 60-second timer is preferred. The amount blown out is 1/10 gallon. This assembly and system is especially useful for sampling and monitoring industrial waste water, or industrial effluent, for preparing makeup water for fermentation and non-chemical sterilization and for the treatment of ground water containing toxic heavy metals in solution by hydrogen sulfide alone.

10 Claims, 11 Drawing Figures

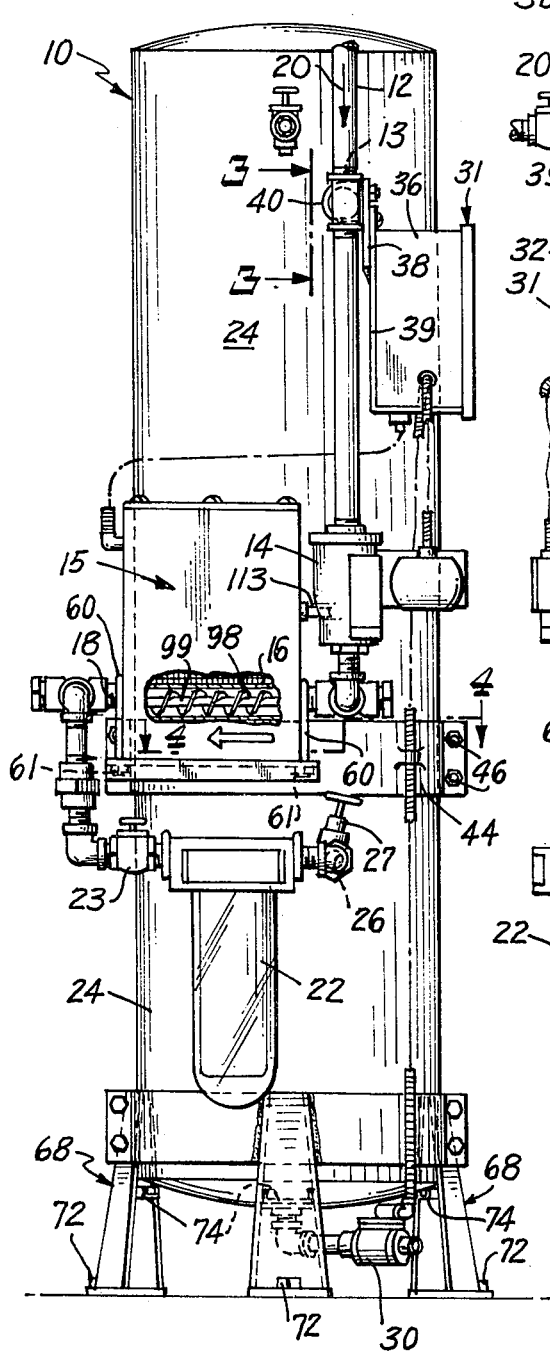
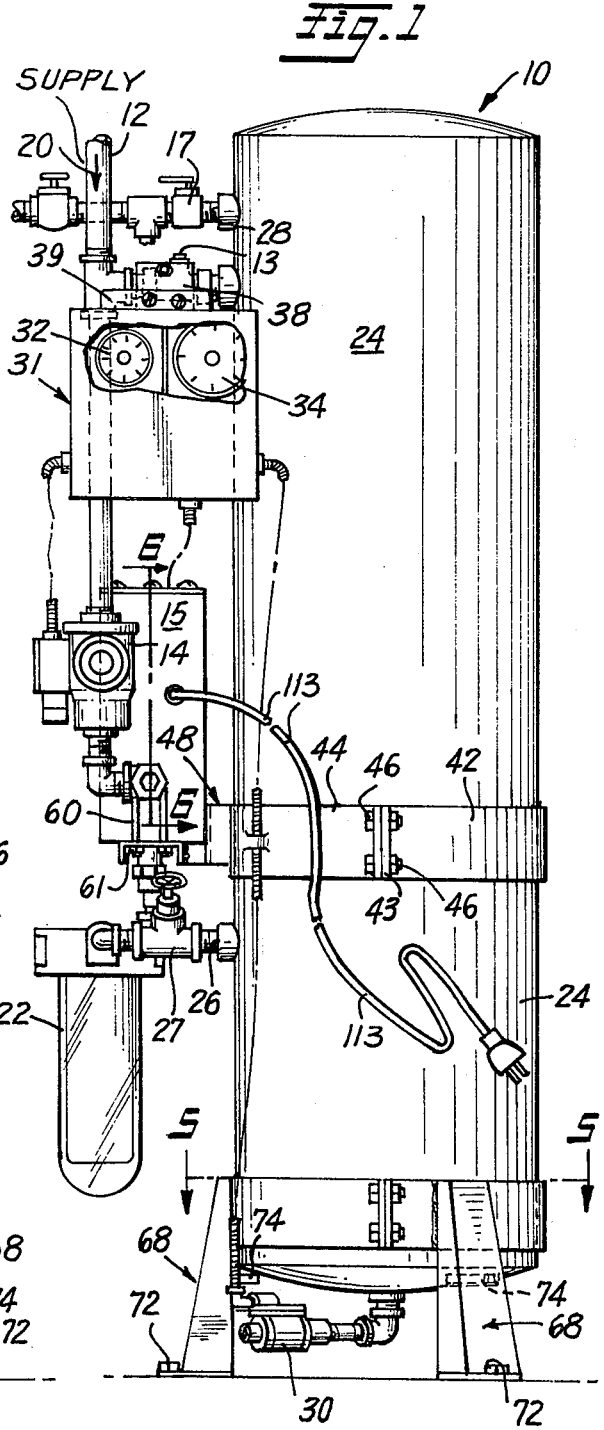

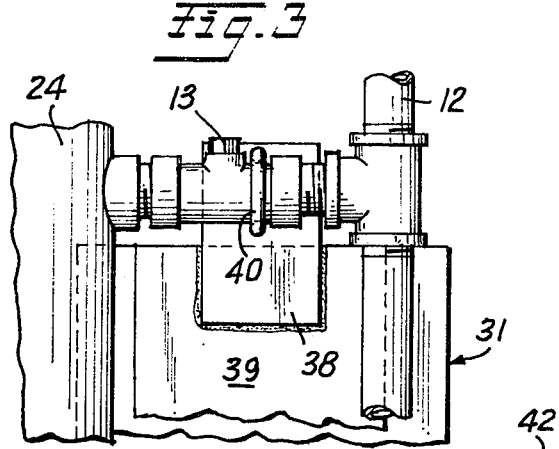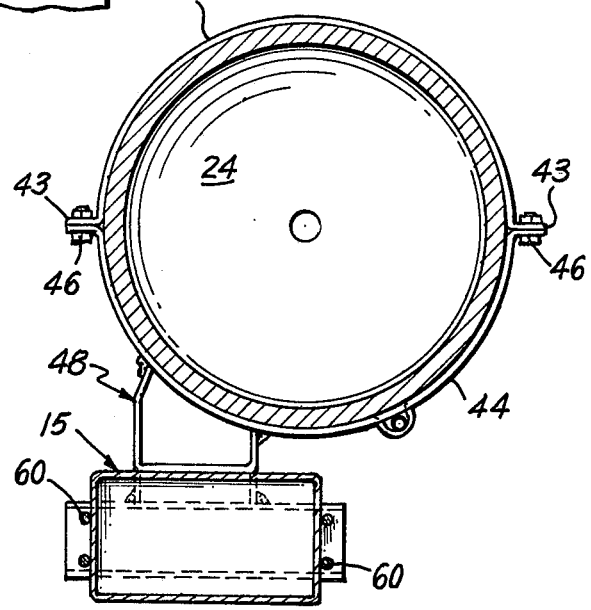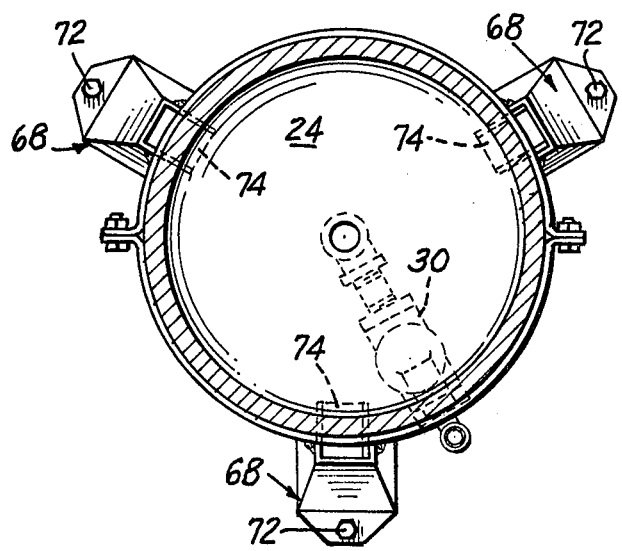

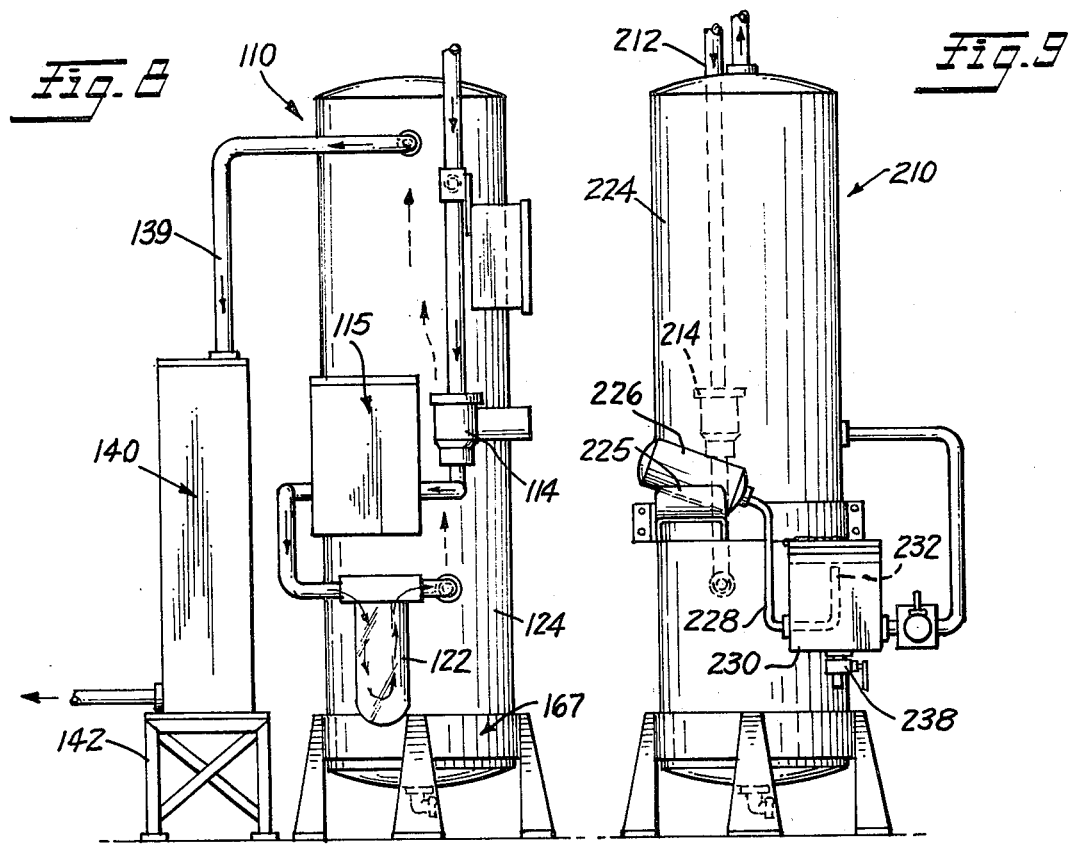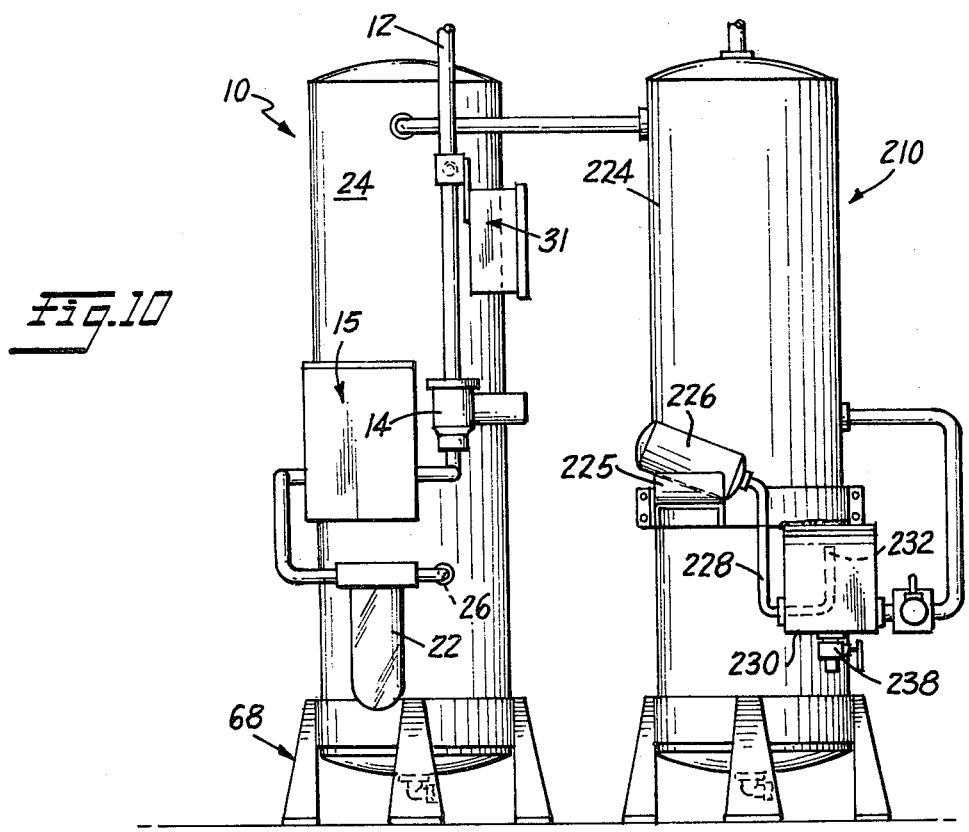

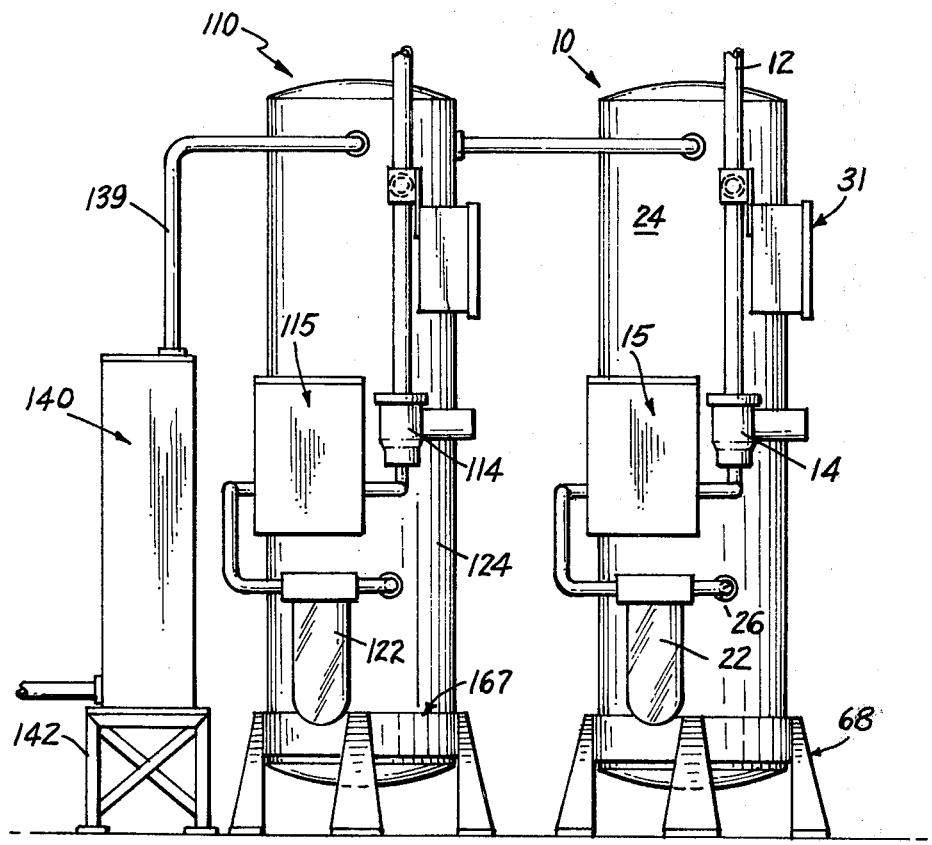

ELECTROMAGNETIC GROUND WATER CONDITIONING SYSTEM AND SAMPLING DEVICE FOR WASTE WATER AND FERMENTATION MAKEUP WATER

CROSS REFERENCE TO RELATED APPLICATIONS

This application is a continuation-in-part application Ser. No. 153,219, filed May 27, 1980, entitled *Free Flow Non-Corrosive Water Treatment Device,* now U.S. Pat. No. 4,288,323.

BACKGROUND OF THE INVENTION

1. Field of the Invention

This invention is in the field of an electromagnetic water treatment device as disclosed in my U.S. Pat. No. 4,151,090 granted on Apr. 24, 1979, and my U.S. Pat. No. 4,148,731 granted on Apr. 10, 1979.

This invention is in the field of low-cost apparatus for physical treatment of water, including ground water, waste water and chemical industrial effluent by electromagnetic forces and for providing a representative sample of the dissolved components carried by the water such as in shown in Belk, et al. U.S. Pat. No. 3,907,673 and Robinson 3,190,231 in which the contaminants are to be removed.

This invention also relates to apparatus for holding a representative sample of water which is treated by electromagnetic treatments utilizing a holding tank which is fitted with a filter along the lines shown in DeLonge, et al. U.S. Pat. No. 4,202,768, but is also fitted with a petcock from which a representative sample may be analyzed by a low-cost test.

This invention also relates to low-cost apparatus for physical treatment of water, including ground water, waste water and the like with ultraviolet rays in order to kill any bacteria therein.

This invention relates to low-cost apparatus for electromagnetic treatment of waste water from fermentation which can serve to conserve the carbohydrate content thereof to provide sterile makeup water, sterilization being accomplished by ultraviolet ray treatment.

2. Change in National Policy of Water Treatment

The recent report by the Council on Environmental Quality entitled "Contamination of Ground Water by Toxic Organic Chemicals" published in the late fall of 1980 reports that 80% of the United States population depends on ground water for drinking. The Council also reports serious contamination of drinking water wells in thirty-four states. Trichoroethylene was found in almost 40% of the cases with some northeastern wells containing concentrations of more than one part per million (ppm). Although the Environmental Protection Agency (EPA) has not yet proposed maximum contaminant levels for drinking water under the 1974 Safe Drinking Water Act, it expects to make a proposal as part of its Interim Primary Drinking Water Standards later in 1981.

Among the EPA regulations that have been delayed are the final rules for pre-treatment required from industries before they can discharge waste into a municipal treatment system. Amended regulations published in October 1979 took into account industry objections to the "consistent removal" rule and redefines "consistent" as that removal demonstrated by averaging the lowest 50% of the removals measured by twelve or more samples.

Also EPA rules stopped by the change in administration under President Reagan are the Rules for Pollutant Discharge Control for electroplating and timber product processing sources.

Based upon the new direction in national policy on environmental health and safety regulations, accurate low-cost analysis under scientifically controlled sampling conditions constitutes a main objective which is imposed as the essential tool to guarantee success of the national policy which can only be carried out with full responsibility in the private sector.

The present invention addresses this objective by providing a low-cost sampling device which faithfully represents the precise composition of the water sample and permits a very easy measure of suspended solids which are filtered out, and also permits the separation of scale which is blown out and collected.

In contrast to the United States practice, Great Britain has controlled the trade effluent from industry, sewage, storm water, drainage, etc. under a continuous series of Acts of Parliament starting with the Public Health Act of 1936, the Drainage Premises Act of 1937, etc. and has adopted continuous sampling rather than spot sampling for effluence of variable composition. In exceptional cases automatic alarm systems are installed to warn of danger caused by toxic chemicals but such systems are not common. Spot sampling is carried out in a time period of at most one to two minutes. Continuous monitoring is deemed to be vitally important and British practice as explained at page 16 of the text "TREATMENT OF INDUSTRIAL EFFLUENTS," Calley, Forster and Stafford, John Wiley & Sons, 1976. Because of the long experience and the use of continuous recording equipment, automatic sampling is stressed and used throughout the private sector. The data is collected and interpreted by expert statisticians in the private sector and in the government who take into account the necessary guidelines for interpretation. However, as pointed out in the text by Callely, et al. the cost of labor to collect and sort the information is very high, the need for more control and better control in treating toxic chemicals have resulted in the increasing sharing of data by regional water authorities and interchangeable use of computers to collect the information.

In contrast to this practice, the present invention proposes to sample waste water, effluent or ground water by collecting at least a forty gallon sample, circulating it by means of a pump through an electromagnetic treatment unit which assures that no unexpected precipitation occurs and passing the sample water through a filter for the removal of suspended organic matter.

3. Requirements for Sampling

As pointed out in the text "ELEMENTARY QUANTITATIVE ANALYSIS" by Willard and Furman, D. Van Nostrand Co., Inc., 1935, at page 5, the selection of a representative sample is fully as important as the analysis itself. As stated at page 29, the sample must be truly representative of the composition of the whole material, otherwise the effort spent will be wasted. In stating proportions of material, this book indicates that for a carload of ore, a large sample of several hundred pounds is taken. Similarly, for a large liquid sample a representative sample must be taken. It is an essential aspect of the present invention that the large sample which is taken of about forty gallons is adapted for small municipalities which do not have the funds to operate large and expensive advanced waste water treatment plants or advanced drinking water plants.

4. Description of the Prior Art

Sampling Devices

In the prior art of water treatment, tertiary treatment of sewage and treatment of ground water containing impurities, small quart size sampling containers have been employed for collecting a representative output. Also various types of electronic and optical monitoring instruments have been used to monitor removal of contaminants from settling basins. An example of one such device which is employed and a method utilized in cleaning the sampling device is found in the patent to Robinson 3,190,321. In Robinson a filter is used together with a pressure gauge in order to assure that contaminants which impair the operation of the instrument, in this case a flotation instrument, are removed and the teaching in this patent extends to a cleaning procedure to eliminate the contaminants from the flotation chamber of the instrument.

Sampling devices are described in specifications of the Hach Company, P.O. Box 389, Leveland, Colo. 80537, which are used in conjunction with test kits for simple low-cost EPA approved tests for water quality, these tests including colorimetric determinations for nitrogen, nitrate in the high range, in the low range, in the intermediate range, nitrogen is ammonia, nitrate, silica, phosphate, sulfite, sulfate, ozone, chlorine, calcium, chromium, dissolved oxygen, pH and other tests. These tests are low-cost tests in contrast with tests which are based upon optical apparatus built for sensing a specific condition. For example, electronic pH meters cost a minimum of $1,000 in the most recent models while a pH kit from Hach costs about $43.50 for the wide range kit and $37.50 for the smallest increment kit. In short, the EPA approved methods for detecting the common impurities at the concentrations encountered in waste water, in raw water and in treated water are available for small users at low cost only if the sampling devices can provide a representative meaningful aliquot portion for the waste water treatment and or the potable water source.

This invention provides this low-cost sampling need for the small user whether he be the independent farmer dealing with surface or ground water or the small municipality who can ill afford to charge its customers the present excessive costs which are involved under the clean air and clean water acts.

In the States of New York, New Jersey, Connecticut and Vermont the fresh water streams and lakes in the recreation areas of the outer Adirondack Mountains and White Mountains have become eutrophic. Present proposals require very expensive installations with undue burden on the heavy industries and abatement of air pollution by smoke use is alleged by some to cause acid rain. Agreement, however, is that acid rain must be eliminated, substances in the air leading to cancer or respiratory disease must be eliminated and that every community, large and small, rich and poor, must live up to a standard cost effectiveness for the common objective of installing low-cost equipment which is highly efficient.

Low costs in testing are obviously achieved by the test kits now on the market, one example is the test kit mentioned available from the Hach Company. However, there is no low-cost method of monitoring and proper sampling large installations nor of permitting unskilled citizens to take care of their own water recovery needs with low-cost equipment.

To illustrate a recent development of high-cost equipment, the most recently announced device is a new instrument from Beckman Instrument Company of Fullerton, Calif., named "Microtox" which tests water to determine toxicity to fish. The present method for checking toxicity is bioassay requiring periods from 24–96 hours. The Beckman machine costing many thousands of dollars makes the test in a matter of a few hours or less and is an optical test. The companies who have tested it over the past nine months with plant effluents are not widely enthusiastic about the machine, but the companies may be forced to purchase the machine if state governments require it.

PRIOR ART IN PARENT SER. NO. 153,219

The electromagnetic treatment as described in my prior application, Ser. No. 153,219 has the unique benefit of conditioning ground water containing the above-named impurities to facilitate the removal of these impurities and at the same time provide a useful monitoring and sampling tank for the continuous or discontinuous testing of the quality of ground water which is being admitted into the system and will be thereafter treated by a purification system whether the purification system is of the conventional type or is of a specialty type to handle specific industrial effluent containing toxic metals, such as mercury.

PRIOR ART OF HOLDING TANKS

In the DeLonge, et al. U.S. Pat. No. 4,202,768 a holding tank is used to collect the effluent from the backwash after it has passed through a sand filter and a carbon filter. DeLonge, et al. operate a beverage and bottling plant which requires very efficient filtration using both sand and carbon filters, together with pH adjustment and backwash treatment. The backwash treatment imposes a large and sudden demand on the system and further requires chlorination and removal of suspended solids which is such a major proportion of all water to all municipal sources. One of the major problems facing the beverage industry is to first remove and then dispose of these solids after they have been filtered. The removal requires large amounts of water and these large amounts must be saved by recycling.

The discussion of the prior art in DeLonge, et al. recognizes the waste water problem, column 2, lines 3–62, and provides a very excellent summary of attempts by others to solve it. The present invention extends the reach of DeLonge, et al. and Robinson by providing a holding tank which is self-cleaning, which deals with the suspended solids problem in waste water by providing automatic blowout and by providing electromagnetic water treatment having a unique anti-precipitation effect on dissolved inorganic solids.

BROAD ADVANCE OVER THE PRIOR ART

It has been discovered that remarkable savings in sampling equipment cost, monitoring equipment cost and testing equipment cost, as well as the very expensive labor costs of highly skilled chemical engineers, can be achieved if the critical elements of my prior parent application Ser. No. 153,219, filed May 27, 1980, are combined with a sampling tank of critical volume in relation to individual and family needs, e.g., about 40 gallons together with automatic blowdown, a filter and a recirculating loop including a pump, the length of the loop having a unique relation to the efficiency of settling of suspended solids and clarification of the water being treated.

To illustrate the average known individual persons need for water of 50 gallons per day and the average family of four known requirement of 200 gallons per day are based upon all of the usages for cooling, drinking, washing, sanitary disposal (flushing urinals and toilets, etc.) which occur during an average day based on averaging annual usage rates over long periods where one or more family members may be away part of the day at work, school or play.

If the water supply is muddy and if usage is low settling is aided by long waiting periods between drawing from the supply. Thus, in a low usage family the water supply tank collects sediment and drawing at low rates from one tap for example at 1-2 gpm represents a totally different condition for sedimentation than at a high rate of 7-10 gpm where water is drawn for cooking, in the kitchen sink, in a bathroom for a bath or shower, in the laundry room for washing and in the powder room for a toilet flush.

It has been discovered that the unit disclosed in my parent application Ser. No. 153,219 is adapted to aid sedimentation in a sampling tank of 90 gallon capacity whether the demand is 1-2 gpm or 7-10 gpm. However, there is a unique cooperation between the recirculating loop filter and blowdown device in the lower demand range. This is totally unexpected.

OBJECTS OF THE INVENTION

An object of the invention is to provide a new combination of circulating loop means fitted with a pump with electromagnetic water treatment means to improve sampling in a sampling modular container comprising a 40 gallon tank.

A further object of the invention is to provide clarification and settling forces which do not depend in any way upon added solid chemical flocculating agents and which rely solely upon electromotive action of iron in the piping between the electromagnetic treatment and sampling device and the impurities such as dissolved sulfide ion in the water which reacts with iron to form insoluble iron sulfide.

A further object of the invention is to provide a low cost monitoring system to check the purity and potability of ground water which was contaminated with sulfide ion or heavy metal soluble ions which react with sulfide ion to permit low cost analysis by known low cost procedures.

A further object is to provide a system of non-corrosive water treatment by the electromagnetic treating unit of my parent application Ser. No. 153,219 in a sampling tank in combination wit a recirculating loop including a pump which aids in removal of suspended solids, sulfur impurities, and toxic heavy metal soluble ions in the presence of iron while further permitting removal of settled scales from the sampling tank by automatic blowdown means and also permits qualitative inspection and quantitative determination of residual suspension in a filter unit also provided in the loop.

Other and further objects of the invention will be apparent from the following summary, illustration of the preferred embodiment in the drawings and detailed description of the preferred embodiments.

SUMMARY OF THE INVENTION

The invention comprises a new combination of holding tank for the monitoring, sampling, and analysis of a water supply from a naturally occurring source such as ground water or a running stream or some other form of water intended for drinking with an electromagnetic water treatment unit connected to a recirculating loop including a pump to enhance the clarification of the water and the settling of solids suspended in said water supply, the sampling tank being provided with timer means and blowdown means for removing suspended solids which settle to the bottom of the tank and aid in the removal of these settled solids into a container at a location below the bottom of the tank. The new apparatus of the invention includes a filter with replaceable cartridge which is adapted to serve as a means to determine the quantity of suspended solids in the water supply which is held in the holding tank. The simplicity of the sampling system represented by the 40 gallon capacity of electromagnetic water treatment, automatic blowdown which is controlled by timer, and recirculating loop provides a means for monitoring the purity and potability of the water using low cost analytical procedures without the need for expensive electronic equipment or computer equipment or highly skilled engineering personnel. Most important the sampling procedure using the equipment of the invention corrects the quantitative proportions of all dissolved and suspended ingredients in the sample by stabilizing these ingredients in the presence of iron and using the electromagnetic forces impressed upon the total water sample to take advantage of the place of iron in the electromotive series vis-a-vis other metal ions, especially heavy metal ions which may be toxic whereby in the presence of sulfide ion present in naturally occurring ground water, insoluble sulfides of iron precipitates in the 40 gallon tank and are separated partly by blowdown and partly in the disposable filter cartridge.

In a modification of the invention there is illustrated and described an add-on attachment which sterilizes the entire sample by ultraviolet radiation only, thereby eliminating any microorganisms (bacteria, fungi, viruses, etc.) which affect safety, potability, taste, color or odor. The main advantage of achieving non-chemical sterilization is that the cost of added acid or alkali is avoided and pollution of the water supply by the objectionable salt buildup in the sterilized water supply is also avoided. Only recently have the problems associated with excessive salt formation been recognized in the water treatment field.

In still another modification the sampling system of the invention is adapted for treating dissolved toxic heavy metal salts dissolved in ground water by introducing small amounts of hydrogen sulfide from a compressed gas cylinder, amounts of the order of 5 to 10 parts per million based on the 40 gallon sample in the absence of any added acid or alkali which would generate salt and recirculating the hydrogen sulfide treated liquid through the electromagnetic unit-recirculating loop circuit whereby there is achieved a gradual diminution of these toxic metal ions by conversion to the insoluble sulfides removeable by the filter or blowdown.

Finally, another modification is described in which waste fermentation liquid components including dissolved carbohydrate are treated for the removal of solids, in which a critical dilution with water is made to aid in the recycling of the waste liquid through the electromagnetic treatment unit and in the recirculation loop without clogging the filter of the system and without interfering with the blowdown operation, this being accomplished by simply doubling the system to double its capacity while diluting the waste by half.

BRIEF DESCRIPTION OF THE DRAWINGS

FIG. 1 is a front elevational view of the water treatment apparatus of the present invention.

FIG. 2 is a side elevational view of the apparatus as viewed from the left of FIG. 1.

FIG. 3 is an enlarged fragmentary elevational view taken on the line 3—3 of FIG. 2.

FIG. 4 is a horizontal sectional view taken on the line 4—4 of FIG. 2.

FIG. 5 is a horizontal sectional view taken on the line 5—5 of FIG. 1.

FIG. 8 is a modification of the apparatus of the invention showing an attachment for sterilizing the water by ultraviolet rays.

FIG. 9 is another modification of the apparatus of the invention showing an attachment for treating heavy metal impurities with hydrogen sulfide.

FIG. 10 is a further modification of the invention for the removal of toxic heavy metals dissolved in ground water or streams combining hydrogen sulfide treatment and dilution.

FIG. 11 is still another modification of the apparatus of the invention for the treatment of waste fermentation liquid combining apparatus for the removal of solids and diluting the carbohydrate solution with measured amounts of liquid for the proper reusing of the carbohydrate values for a subsequent fermentation.

DESCRIPTION OF THE PREFERRED EMBODIMENTS

Figure 6:
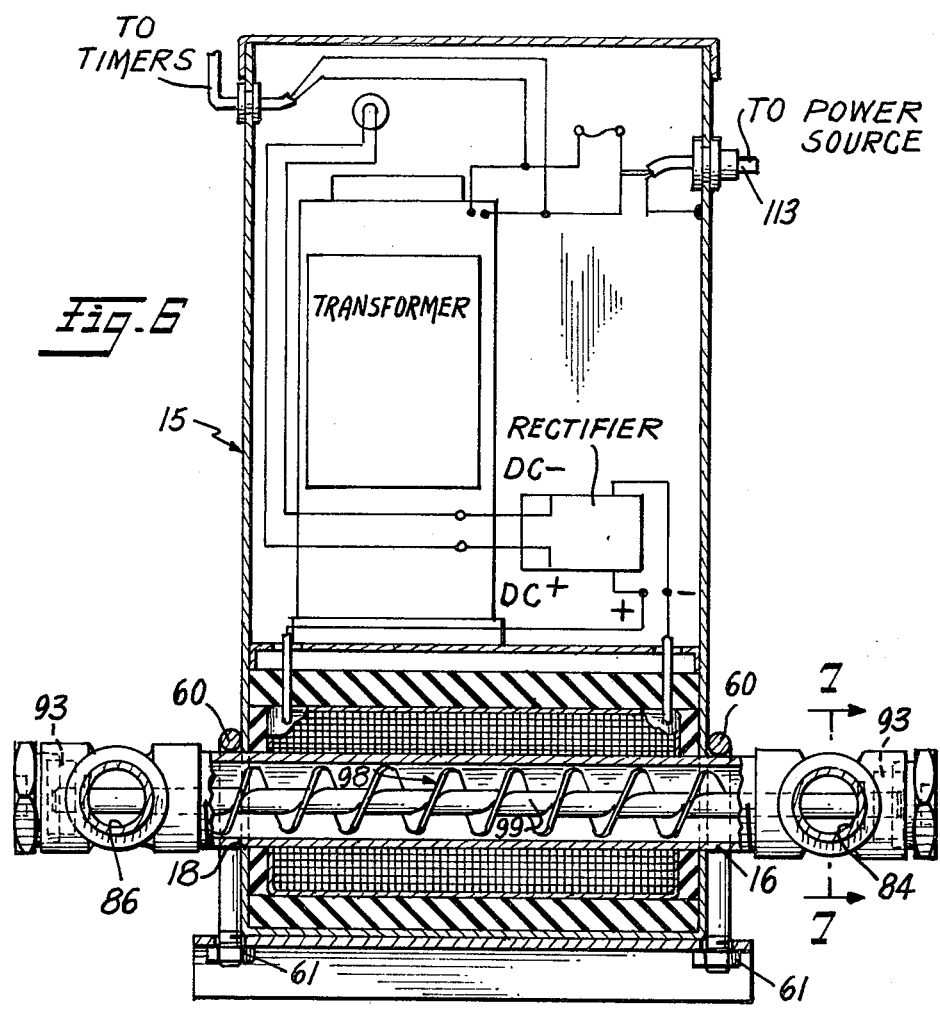
FIG. 6 is an enlarged vertical sectional view taken on the line 6—6 of FIG. 1.
Figure 7:
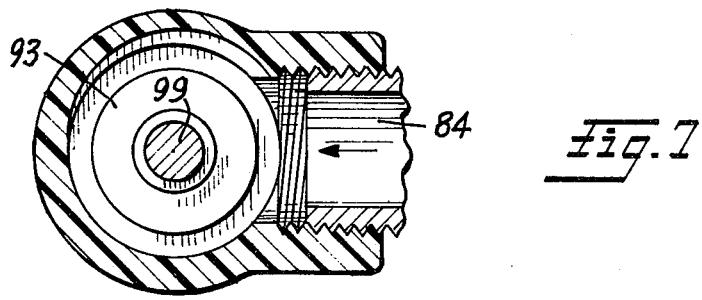
FIG. 7 is a vertical sectional view taken on the line 7—7 of FIG. 6.

The electromagnetic ground water conditioning apparatus and sampling means 10 of the invention illustrated in FIGS. 1–7 comprises a holding tank 24, a pump 14, the electromagnetic water conditioning unit 15 which lies behind the pump and a filter unit 22 which lies ahead of the pump to adapt the tank 24 to serve as the sampling tank for ground water from which a sample of the conditioned water subjected to electromagnetic forces, to filtration and recirculation by the pump to provide a representative sample which is based in total volume on the capacity of the tank 24.

An important support feature of the water treatment apparatus 10 comprises semicircular band 42 fitted with flanges 43 and the U-shaped bracket 48 which serves to mount the electro-magnetic unit 15 in its proper relationship for electromagnetic water conditioning of supplied water through inlet pipe 12 which enters the unit 10, passes through pump 14, then through the electromagnetic unit 15 and finally out of the filter 22 through the line 26 which provides the filter water inlet into the tank. As shown in FIGS. 4 and 5, the two bolts 46 provide a simple band which supports the bracket 48, a U-shaped bracket which further serves as a tray in the support of the electromagnetic unit. The configuration of the U-shaped bracket in side view is shown in FIG. 1 and its structural attachment by welding to the band 44 is shown in FIG. 4. The fitting of the two pairs of U-shaped bolts 60 on each side of the tray by means of corresponding fasteners 61 permits the easy but secure assembly of the electromagnetic unit with its attached pump 14 and its attached filter 22.

Generally indicated at 31 is a compartment in which timers 32 and 34 and a control circuit for these timers assure automatically controlled and repetitive blowout of settled solids at the bottom of the tank 24. A blowout valve 30 at the bottom of the tank under the control of the timing devices 32 and 34 permits the drainage of the settled solids which may be to a container (not shown) which is adapted to be slid below the bottom of the tank 24 between the channel-shaped tapered leg supports 68 which serve to support the tank. The primary timer 32 is a 24-hour timer which sets the blowdown start of discharge of the settled solids at the bottom of the tank. The secondary timer 34 is a minute timer which sets the duration of the blowdown. Both the primary timer 32 and the secondary timer 34 are enclosed in a compartment 31 which comprises a support means on which the primary timer and secondary timer are mounted.

The contaminated ground water supply flows through water inlet 12, to pump 14 and then through electromagnetic water conditioner unit 15, passes through a disposable cartridge filter element 22 of twenty microns pore size, and water inlet 26 is located at a height of about one-third of the height of the tank starting at the bottom of the tank 24.

A check valve 13 is inserted to avoid the contaminated water coming from inlet 12 going to tank 24.

If contaminated water coming from inlet 12 is not entering into the system, pump 14 is always recirculating water existing in the tank 24. Water is taken almost from the top of tank 24 about four inches below outlet 28, and water is passed through electromagnetic water conditioning unit 15, filter 22, and poured into tank 24 at one-third of the total height of inlet 26.

It is an advantage of the invention that visual indication is permitted by the filter 22 and by the automatic blowdown system which comprises the drain valve operated by the timing devices 32 and 34. The stand which comprises the U-shaped support brackets 74 held by bolts 72 bring the tank up to a sufficient height that the outlet from the drain valve 30 can be collected in a suitable shallow container and the contents inspected. The casing of the filter unit 22 is formed of transparent plastic and the disposable cartridge in the filter unit can be seen during operation to permit visual inspection of precipitated particles. Of particular importance to this operation which is easily observed at 2½–3 feet from the ground is the strap unit formed by the bands 44, the pair of fasteners 46 and the U-shaped bracket 48 bringing the critical elements into the proper position at a center portion of the apparatus 10. Of particular importance to this location is the fact that the operation of the impeller parts 98 and 99 in the electromagnetic unit within pipe 16 must be checked to assure that the impeller is rotating in response to the pumping pressure of the pump 14. Without such rotation the electromagnetic water conditioning treatment becomes ineffective. The essential magnetic treatment requires rotation even at small pressure differential by the electromagnetic impeller unit which is mounted in bearings 93 at both ends of the T, the water entering the T at inlet 84 and exiting from the T at the opposite end at exit 86.

The timing devices compartment 31 which comprises electrical lines through the support means consisting of a metal cabinet 36 in which two timers 32 and 34 are mounted, the first timer being a primary clock timer 32, which is suitable for twenty-four hours operation and is adapted to be on/off every hour in accordance with a pre-programmed evaluation of the dirtiness of the inlet water. The secondary timer 34 whose cycle is half an hour is provided with conductive strips or micro-switches every minute, each strip giving an impulse to the micro-switch so that the strip can trigger a solenoid operated drain valve 30, in accordance with the presetting for the blowdown. The optimum setting for the strips gives a fifteen second opening of the solenoid drain valve 30. In dealing with a very dirty water the usual setting for the problem water has been two strips per thirty-minute cycle of the secondary timer 34 to properly manage the trigger drain valve 30.

In order to energize the timer system one plugs the cord 113 into the live current (110 V) and the power cord 113 is also connected to the primary timer 32 while grounded to the compartment 31. This timer 32 also energizes the electromagnetic water conditioning unit 15 which is the unit in Ser. No. 153,219 and to pump 14, and finally to the secondary timer 34. Consequently, secondary timer 34 energizes the solenoid drain valve 30. The electrical contact is made when the strips used as the timer setting, trigger the micro-switch formed by the strip. It is contemplated that an additional feature for energy conservation may be added, if a second solenoid drain valve (not shown) is installed in a home water heater. In this case the same secondary timer 34 can be connected to the home hot water heater and could operate it automatically, the considerable savings will be achieved because of the clearing away of scale deposits from the heating elements of the domestic hot water heater. Recirculation by the pump aids in removing scale deposits as they form and in keeping the heating elements free from scale.

The function of solenoid drain valve 30 is disposal of scale to drain undesirable precipitated elements or sediment already contained in the polluted water, once it has been clarified in the holding tank 24 and after it has passed through the electromagnetic unit 15, pump 14, and filter 22 in its recirculation path.

A supporting plate 38 secures the top part of the cabinet 36 to the piping system and another like plate 39 similar in L form to plate 38 is used to secure the cabinet to eliminate vibration that could affect the primary and secondary timers. Connection to the pipes is by means of U-bolt 40.

The filter shut-off valves 23 and 27 permit closing water flow between the filter and the rest of the system in order to replace the filter and the cartridge.

In an average field treatment of sulphide contaminated water, hereinafter sulphur water, entering through inlet 12 with a content of 30/40 ppm of sulphur as analyzed by the Hach test after recirculation once through the system has the sulphur content reduced to 0.1/0.2 ppm of sulphur using the same Hach test to determine the sulphur content. The iron reduction in these cases goes from 10-20 ppm to 0.2 to 0.3 ppm (parts per million).

In the preferred embodiment of the apparatus of FIGS. 1 and 2, timer devices compartment 31, cabinet 36 and control timers 32 and 34 are purchased from Intermatic, Inc., Elton Grove, Ill.

The pump 14 is formed of cast iron and is purchased from Myson Incorporated of Fredericksburg, Va.

The filter 22 and its cartridge are purchased from Keystone Filter Company. The replacement filter cartridge may also be purchased from the Millipore Co. suppliers of filter sheet material of predetermined pore size. The optimum pore size for the sheet cartridge is twenty microns.

The forty gallon tank is purchased as a glass-lined tank from the Glass Lined Water Heater Co., Cleveland, Ohio.

The solenoid valve is purchased from Royal Coach Sprinkler Co., Clovis, Calif.

The plastic pipe for the recirculation line is purchased from Crestline Company, Pompano Beach, Fla.

The recirculating pump 14 gives the optimal flow required for the positive rotation of the propeller contained inside the electromagnetic water conditioning unit. This is due to the fact that the amount of water into the housing may be varied in gallons per minute in accordance with the needs for use in washing, flushing toilets, bathing, cooking, etc.

The basic construction of the water conditioning system and sampling device for ground water described hereinabove and illustrated in FIGS. 1-7 may be combined with an ultraviolet sterilizer as shown in FIG. 8 or with a bottled hydrogen sulphide source as shown in FIG. 9 or further modified to treat toxic heavy metals if industrial effluent pollutes ground water or streams in accordance with the embodiment shown in FIG. 10. Although the specific purchased components are mentioned to facilitate repair and reconstruction, the invention is not limited to the components described hereinabove and other sources of supply may be found.

An important advantage of the basic system is that it can be used with the low cost Hach test kit.

It is contemplated that in a case where tank 24 must have a bigger capacity then pumping capacity can be increased for the pump but a larger system presents the inconvenience of weight, space for installation, higher shipping costs, and is more difficult to install.

The sampling operations are now described for a forty gallon tank.

The basis for selecting forty gallon tanks are (a) the weight, (b) the dimensions, (c) the time which must allow residence time needed for faster clarification and sedimentation of polluted water. For example, a home where two adults and two children are living is considered to have a peak flow of about 7 GPM. The system has been designed to handle ten gallons per minute continuously and to recirculate this ten gallons per minute so that the sedimentation of suspended solids will occur through filtration and clarification of the water in the forty gallon tank. The inventor has found from experience that a tank larger than forty gallons, for example an eighty gallon tank, is too costly and of doubtful practical benefit for the operation for a family of four individuals. Also a tank smaller than a forty gallon tank is insufficiently large to provide adequate residence time for clarification and sedimentation. It is unique for satisfying the needs for a family of four for daily use where the separate water-demanding tasks can be planned ahead of time that a forty gallon sampling tank serves as a holding tank for the water requirements and that the resulting cost based upon off-the-shelf replacement items for pump, filter, etc. should be of the lowest cost.

Samples of water are taken before water enters inlet 12 and analyzed with the Hach test kit for sulphur, iron, pH, total dissolved solids.

Comparison samples are taken from petcock 17 installed after outlet 28, and also analyzed with the same Hach test kit verifying considerable reduction in iron, sulphur, low reduction in TDS (about 25%), little reduction in Ca, Mg, nitrates.

Extremely hard water 125/150 grains per gallon acquires the properties of softened water for washing and rinsing after its recirculation.

Since the first prototype was built in late September 1980, the inventor has achieved remarkable results in more than forty applications for ground water treatment. A few typical cases are set forth below:

At Glens Falls, N.Y., in the farmhouse where the customer had lived forty-three years and during that time water had an odor of rotten eggs, the water causing the faucets to be stained with a green deposit. Similarly, the toilet bowls and lavatories were stained with black deposits. The water was analyzed for sulphur indicating 45 ppm. The unit was put into operation for four weeks. During the initial three weeks of operation, the filter cartridge was changed every three/four days. After the third week, the filter was changed only once a month. All greenish stains in faucets were gone, the same as the black stains in toilets, lavatories, etc.

In Billings, Mont., the customer's complaints concerned the expense for city water as cooling water to cool compressor heads and the cost of mineral acid to clean up the calcium deposits in the cast iron cooling compressor heads and water line which were needed every six months. The customer drilled a well in which hardness of the water was in the range of 130–140 grains, average 135 grains. A unit in accordance with the invention was installed and in six weeks the compressor heads were free from scale deposits. The acid cleanup which had been used to clean the compressor heads was no longer necessary. The customer claims to save about $400 monthly in the city water charge and acid cleanup cost.

In Winsdom, Minn., the customer used well water on his farm for home use and for four thousand head of baby pigs. The Hoch test showed a high magnesium sulphate content and iron at 15 ppm in the well water. This pollution was causing scouring problems and rust stains. Also the deep well pump required frequent servicing and was difficult to pull up. The unit of the invention was installed and the scouring problem was overcome, the rust stains disappeared and the service maintenance on the pump was no longer as before.

Another installation was made in late November 1980 in Pagosa Springs, Colo. for a customer who had a water source which was so heavily contaminated with sulphur that the customer had to take a shower or bath out of the home. The apparatus of FIGS. 1–3 was installed and the water so treated became suitable for drinking as well as bathing.

In the embodiment of FIGS. 1–3 the electromagnetic unit 15 is supported by means of the fasteners 46 and band 44 on the flanges 43 of semicircular band or truss 42. The fasteners 46 serve as a truss and support the tray in its encircling relationship about the tank 24. The two bolts 46 serve as the only fasteners at the trussing site of band 42. The mounting of the electromagnetic unit on the tray in its proper relationship to the pump 14 and with the outlet 18 from the electromagnetic unit 15 in direct communication through the line past valve 23 into the filter unit 22 presents a modular preset arrangement of these three critical units, pump, electromagnetic unit and filter at the center portion of the tank 24 for easy access and manipulation.

Obviously, it is within the purview of the invention to make slight changes in the pipe in order to eliminate the expense of 90° elbows and the resistance that such elbows cause in the water flow through the system. For example, the elbow at outlet 18 may be a straight line and a direct outlet from the T may be provided at the outlet of the electromagnetic unit.

The electromagnetic unit is shown in detail in FIG. 6, it being noted that this showing in FIG. 6 is modified to include the timers precisely in accord with that of applicant's parent application Ser. No. 153,219 filed May 27, 1980. The flow of water which is shown in FIG. 2 at inlet 12 by the arrow 20 at the top of FIG. 2 illustrates the passage of water through the line leading into pump 14 then into the inlet of the electromagnetic water treating unit 15 through T 80, the details of the inlet being shown in FIG. 6. The inlet 84 of T 80 permits the passage of water to rotate the impeller 98, the impeller being made of ferro magnetic metal and having about 7–8 flights or turns. As pointed out in parent application Ser. No. 153,219, the flights of the impeller 98 permit the rotation of the impeller about the shaft 99 where only one faucet is open in the line, the opening of one faucet representing a pressure drop of about one pound per square inch. Rotation of the propeller is an essential factor in proper magnetic treatment of the liquid passing through the system. The magnetic field of about 3,000 Oersteds is impressed upon the water flowing through the system and this magnetic treatment enhances sedimentation of iron particles dissolved or suspended in the water and enhances the reaction between such iron particles and sulphur. Precipitated matter which deposits as scale in the base of the tank 24 is blown out. Suspended matter larger than twenty microns in particle size is filtered by the filter cartridge of filter 22. Only the combination of filtration, blowdown and electromagnetic treatment interact in a controlled program timing sequence to aid the clarification of the water.

As pointed out above, reduction of suspended solids in the amount of at least 25% and cleaning away all scale is simultaneously achieved while sulphur is eliminated in the form of iron sulfide. The iron in the ferro magnetic impeller and in the iron pipe section constituting the conduit 16 through which water flows in unit 15 is adequate for the removal of sulphur from the water as well as other heavy metal ions, in the presence of sulphur, react to form insoluble products. Of these, arsenic, manganese, lead and copper salts form precipitates which settle out with the scale or which may be removed along with suspended organic matter when there is a substantial sulphur content in the water being treated.

In FIG. 8 there is shown a modification of the apparatus of the invention for sterilizing the water to rid it of microbial growth. This modification includes all of the elements of FIGS. 1–3 but in order to show the distinctness of this separate modification, the apparatus is given reference numeral 110 instead of 10, the electromagnetic unit being given reference numeral 115, the filter given reference numeral 122, the tank given reference numeral 124, the stand for the ultraviolet unit being given reference numeral 142, while the other stand for the tank 124 is given a reference numeral 167.

It is seen that this unit operates on the identical principle of combined electromagnetic treatment, pumping, recirculation and filtration with automatic blowdown of scale within the tank as in the case of FIGS. 1–3 but with the added treatment of the exit liquid in conduit 139 through the ultraviolet unit so as to reduce to less than 0.01% the bacterial count which may persist under conditions of contamination. The combination unit of FIG. 8 has the advantage of treating fecal contamination without requiring any added chemicals, without encountering any by-product agglomerating agents such as filter aid (celite) or the like and of low cost because of the avoidance of expensive chemical equipment and treating materials.

In FIG. 10 there is shown a further embodiment of the invention in which a special auxiliary hydrogen sulphide means is added for treating heavy metal impurities as may be encountered in industrial waste. This further modification depends upon the auxiliary apparatus for introducing hydrogen sulphide by means of bottle 226, hydrogen sulphide from a commercial source held in cradle 225 and connected to conduit 228 so that hydrogen sulphide enters through bubbler tube 232 into the chamber 230 of the reservoir which is used to dose the system 210 which combines electromagnetic treatment pump, recirculation and filtration. Polluted water which enters the system or apparatus 210 through inlet 212 is pumped by the recirculating pump 214 and is simultaneously dosed by small quantities of hydrogen sulphide, concentrations of the order of 5-10 ppm of hydrogen sulphide so that any heavy metal salts which are contained as pollutants within the polluted water supply precipitate within the tank 224. The precipitate which remains suspended in the form of fine particles of insoluble sulphide is recirculated and the crystals grow to a size where they are readily removed by filtration in the filter 22. The advantage of the system of FIG. 10 as compared with the system of FIGS. 1-3 is that the capacity for treatment is doubled, there being present two forty gallon volumes interconnected in series which provide recirculation and easy detection of the efficiency of treatment using the standard low cost Hoch test. For this purpose, the apparatus of FIG. 10 is provided with a petcock 238 from which a sample for the Hach test is taken.

In FIG. 11 there is illustrated an embodiment uniquely adapted for recovering expensive carbohydrate from fermentation, separating the carbohydrate as a solution from suspended solids which are the waste products in waste fermentation. Suspended solids are removed in the filters 22 and 122 of the two units of apparatus 10 and 110 which are hooked to each other in series. Only one of these units is fed with the waste fermentation liquids and the other of the units is fed with water which serves to dilute the fermentation liquid to a value of one-half its former concentration thereby aiding in the removal of the suspended solids which include organic matter and insoluble inorganic salts which have precipitated. There is a remarkable benefit imparted by the electromagnetic treatment of the units 15 and 115 imparted in each of the systems 10 and 110 respectively so that the effective recirculation path is doubled. This recirculation path is aided by the two pumps 14 and 114 and in the series hookup it is seen that there is made possible a controlled removal at a higher degree of dilution than would be possible by any other method.

Finally, the need for total sterilization is achieved by the addition of the ultraviolet radiation sterilizer 140. The treated liquid which exits from the bottom of the sterilizer 140 is not only free from all microorganisms but is also clarified, free of suspended organic solids and free of any salts which would impair the re-use of this material in a later fermentation.

The adaptability of the system illustrated in FIG. 11 for treating chemical waste will be better understood if one considers the common problems in the handling of industrial waste which become complicated by the addition of acid or alkali to adjust the pH or to bring the system to neutrality. In such instances, any chemical addition whether it is acid, alkali or treating agent adds salts, adds costs for the addition and requires additional physical or chemical treatments which may involve chilling, filtering, evaporating, and the like in order to eliminate the salts. It has been discovered that all of these additions may be eliminated by simple reliance upon electromagnetic treatment which uniquely conditions the precipitate which forms and which causes agglomeration.

Thus the unit in FIG. 6 which includes transformer 107, rectifier 108, indicator light 109 operating on 110 volt line current from plug 88 in socket 89 disclosed in my application Ser. No. 153219 efficiently creates a magnetic field of about 3,000 oersteds within ferromagnetic conduit 96, the impeller 98 being supported from shaft 99 in bushings 90 of the plugs 88 at each end. The 7 flights rotate at pressure differentials as low as 1-2 pounds. The end T fittings 80 and 82 contribute formed at inlet 84 and outlet 80 permit easy assembly and cleaning. This unit of FIG. 6 is essential to all embodiments and the preferred assembly of T fittings increases efficiency and lowers costs.

The sterilizer unit 140 in FIGS. 9 and 11 is readily available at reasonable cost from Trojan Environmental Products, London, Ontario or Ultraviolet Technology, Inc., 7835 Wilkerson Court, San Diego, Calif. 92111.

The Trojan unit costs $350.00 and is fitted with a ¾ inch inlet pipe, a similar outlet pipe for a flow of 5-13 gpm under exposure of ultraviolet with a MWS rating of 21,370 (40 watts) for duration of exposure at maximum flow of 1.62 seconds and for a maximum exposure of 4.2 seconds.

The Ultraviolet Technology machine is similar but uses a GE lamp and the flow rate is at 10 gallons per minute.

Having thus disclosed the invention, what is claimed is:

1. An electromagnetic ground water conditioning apparatus comprising:
   a holding tank with an inlet and an outlet for holding ground water which is treated in said apparatus;
   an electromagnetic water conditioning unit comprising an inlet from said tank, a ferromagnetic casing, an electromagnetic winding surrounding said casing to create a magnetic field of about 3,000 oersteds on said casing, an impeller mounting in bearings at each end of said casing which rotates in response to the water pressure from said inlet and a water outlet at the other end of said casing;
   a pump between said holding tank outlet and said electromagnetic unit;
   a semicircular band fitted with flanges which encircles said holding tank and is adapted to hold a bracket supporting means to mount said electromagnetic unit at about the middle of said holding tank;
   a bracket connected to said band to mount said electromagnetic water conditioning unit;
   a pipe means connecting said pump to the inlet pipe of said electromagnetic unit;

a filter means between said pump and inlet pipe fed by water passing through said pipe means;

said pipe means further connecting said filter means to the outlet of said electromagnetic unit;

a return line from the outlet of said filter to said holding tank for recirculating water from said filter back into said holding tank by the pumping action of said pump into said electromagnetic water conditioning unit; and a blowdown unit comprising timing devices electrically connected to a solenoid operated drain valve at the bottom of said tank whereby solids precipitated by the electromagnetic treatment in said electromagnetic unit are blown out of said tank for predetermined short intervals of the order of seconds to thereby clarify the incoming water without the need for water treatment chemicals.

2. An apparatus as claimed in claim 1 including support means at the bottom of said holding tank to adapt a sample to be taken of the blowdown at the bottom thereof and wherein said timing devices comprise a twenty-four hour timer and a thirty minute timer, each of said timers being adjustable to preset the time of blowdown and the duration of blowdown.

3. An apparatus as claimed in claim 2 wherein said holding tank is provided with a sampling pipe connected to the tank at the top and a valve with a petcock by means of which a sample of water representative of the entire volume of said holding tank may be drawn through said petcock.

4. An apparatus as claimed in claim 3 wherein said filter means is provided with a disposable cartridge filter having a predetermined pore size of the order of twenty microns to remove solid particles larger than said pores.

5. An apparatus as claimed in claim 4 wherein the outlet pipe from said holding tank is combined with an ultraviolet sterilizer whereby water entering said sterilizer is irradiated by radiation effective to kill microorganisms, viruses, fungi and bacteria.

6. An apparatus as claimed in claim 1 wherein said holding tank is combined with a source of hydrogen sulfide and bubbling means for said hydrogen sulfide to dose the incoming water with an amount of hydrogen sulfide of the order of 5-10 parts per million whereby any heavy metal salts contained in the incoming water supply are subjected to precipitation as insoluble solid particles of heavy metal sulfide in said holding tank whereby said precipitated sulfide in the form of fine particles is removed by filtration in said filter means.

7. An apparatus as claimed in claim 1 wherein said holding tank assembly with filter, pump, and support means is combined with another assembly of the same construction in series and the capacity of the combined assembly is doubled to thereby adapt the holding tank apparatus for dilution in the treatment of chemical waste and fermentation waste, the dilution being achieved by adding water in one said assembly to fermentation or chemical waste in the other said unit so that circulation between the two assemblies effectively dilutes the concentration of the waste by about fifty percent.

8. An apparatus as claimed in claim 7 wherein said assembly is connected to an ultraviolet sterilizer for irradiating the circulated liquid with ultraviolet light to destroy microorganisms.

9. An apparatus as claimed in claim 8 wherein a short communicating pipe connects said sterilizer to the outlet from said one electromagnetic water conditioning unit.

10. An apparatus as claimed in claim 1 wherein said holding tank has a capacity of forty gallons and said impeller has at least six turns to that the electromagnetic water conditioning is responsive to a pressure difference from said pump of about 1-2 pounds per square inch which occurs when a water faucet in a lavatory connected to the apparatus is opened with said water conditioning system operationally connected thereto, the impeller rotating in response to said drop in pressure.

* * * * *